Feb. 14, 1967 O. M. LEWIS 3,304,097
ADJUSTABLE COMPENSATING TANDEM WHEEL SUSPENSION FOR VEHICLES
Filed July 2, 1965 2 Sheets-Sheet 1

INVENTOR.
ORVAL M. LEWIS
BY *[signature]*
ATTORNEY

Feb. 14, 1967     O. M. LEWIS     3,304,097

ADJUSTABLE COMPENSATING TANDEM WHEEL SUSPENSION FOR VEHICLES

Filed July 2, 1965     2 Sheets-Sheet 2

INVENTOR.
ORVAL M. LEWIS

BY *F. R. Geisler*,
ATTORNEY

United States Patent Office 3,304,097
Patented Feb. 14, 1967

3,304,097
ADJUSTABLE COMPENSATING TANDEM WHEEL
SUSPENSION FOR VEHICLES
Orval M. Lewis, 1118 Main St.,
Sweet Home, Oreg. 97386
Filed July 2, 1965, Ser. No. 469,131
3 Claims. (Cl. 280—104.5)

This invention relates to vehicle tandem wheel suspension in which up and down movement of the individual wheels may take place automatically for equalizing the load on the wheels and for compensating for irregularities in the terrain encountered by the wheels individually, and also in which the wheels may be manually adjusted up or down with respect to the frame or body of the vehicle for the purpose of altering the position of the wheel-supported frame or body with respect to the ground.

Specifically the invention in particular relates to trailer vehicles designed for transporting machines, mobile implements, heavy cargos and the like, where it is designed to lower at least the rear end of the deck or load-supporting bed of the trailer for loading or unloading, and also when it is desired to maintain the deck or bed in substantial horizontal position even when the trailer vehicle is moving over rough terrain.

An object of the invention is to provide an improved tandem wheel suspension which will permit the body of the vehicle, or the bed of the trailer, to be raised, lowered or inclined with respect to the ground, with all wheels maintaining engagement with the ground.

A related object is to provide an improved tandem wheel suspension, particularly adapted for load-hauling trailers in which the individual wheels automatically move up and down to compensate for irregularities in the terrain regardless of the position to which the bed or deck of the trailer may be adjusted with respect to the ground level.

A further object of the invention is to provide an adjustable and equalizing wheel suspension which will be of very simple and practical construction, moderate in cost, easy to operate, and having no special maintenance problem.

The manner in which, and the means by which, these objects and other incidental advantages are attained will be readily understood from the following brief description wherein reference is made to the accompanying drawings:

Figure 1:
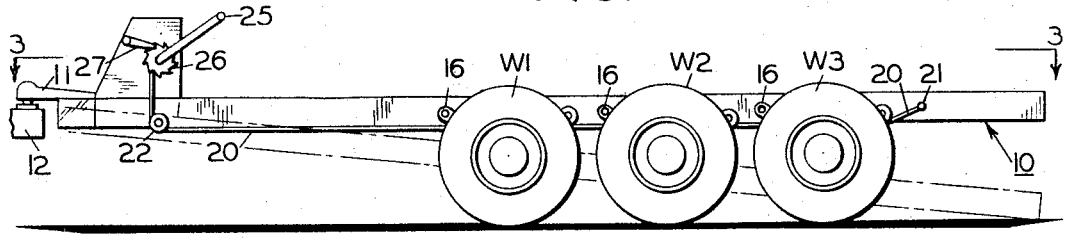
FIG. 1 is a side elevation of a tandem wheel trailer embodying the present invention, the trailer being shown in full lines with the bed or deck in normal substantially horizontal position, and the position or deck in inclined position or ramp fashion for loading or unloading being indicated in broken lines.
Figure 3:
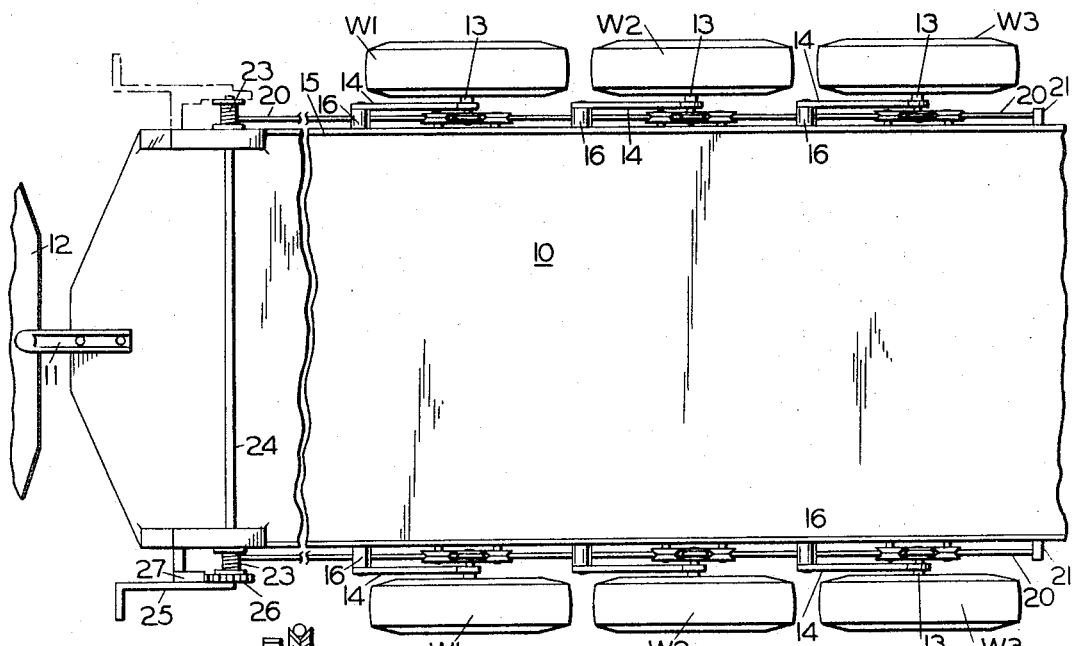
FIG. 3 is a foreshortened top plan view of the trailer, drawn to a larger scale than FIG. 1 but to a smaller scale than FIG. 2.

Referring first to FIGS. 1 and 3, the bed or deck of the trailer vehicle is indicated as a whole by the reference character 10. The front end of the trailer vehicle is attached by any suitable hitch means 11 to the towing vehicle, indicated in part at 12. The trailer vehicle is illustrated as supported on three wheels W1, W2 and W3, at each side in tandem arrangement.

Figure 2:
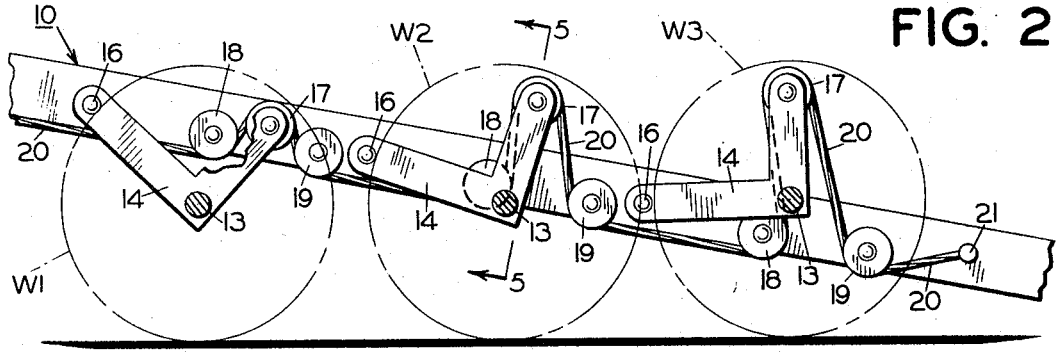
FIG. 2 is a fragmentary side elevation of the same trailer, drawn to a larger scale, with the near side wheels removed and indicated by broken lines, and with the trailer bed shown in the inclined position for loading or unloading and thus extending in ramp position between the towing vehicle and the ground.
Figure 5:
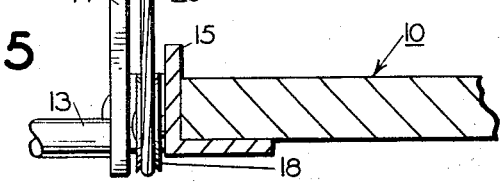
FIG. 5 is a fragmentary section on line 5—5 of FIG. 2 drawn to a larger scale.
Figure 4:
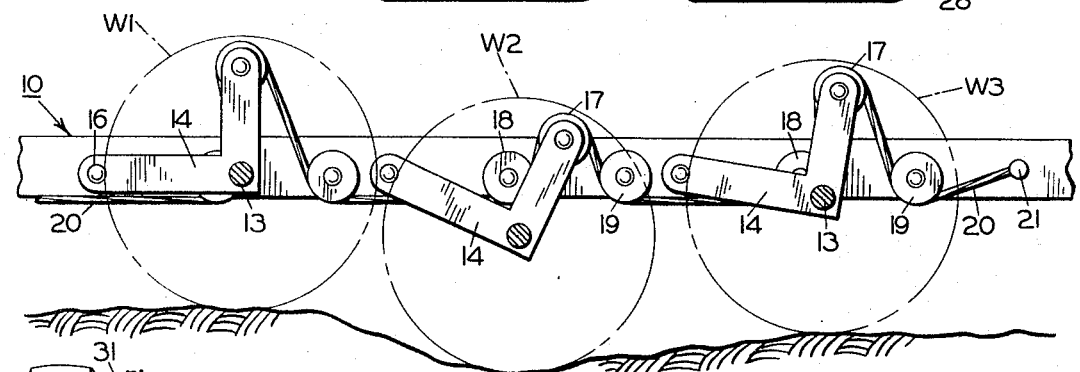
FIG. 4 is a side elevation, similar to FIG. 2, with the near side wheels omitted and indicated by broken lines, showing the trailer with the bed in normal substantially horizontal position, but illustrating the compensating or equalizing action of the wheel suspension on rough terrain.

Since the mounting of the tandem wheels is the same on both sides of the trailer it will suffice to describe the mounting of the wheels on one side (thus the near side) with reference to FIGS. 2, 4 and 5.

The wheels are all identically mounted. Each wheel is rotatably mounted on a stub shaft or axle 13 which stub axle is carried on a knee 14. Each knee 14 comprises a pair of integral portions extending substantially at right angles to each other, and the stub axle 13 carried by each knee is located in the middle portion of the knee where the two end portions of the knee come together. At the forward end of the knee, that is to say the end extending towards the normal direction of travel of the trailer vehicle, the knee is pivotally mounted on the side rail or frame member 15 of the bed or deck of the trailer vehicle, being mounted on a suitable stub shaft 16 secured to the frame member 15, the knee being spaced about four inches from the side of the frame member 15 by a spacing sleeve on the stub shaft 16 or other suitable means. A pulley 17 is rotatably mounted on the inside face of the opposite end of the knee, the pulley 17 being spaced slightly from the inside face of the knee but also positioned sufficiently close to the inside face of the knee 14 so that the pulley 17 will be spaced from the face of the frame member 15 whenever the permitted up and down movement of the free end of the knee causes the pulley 17 to move past frame member 15 (see FIG. 5).

A pair of cooperating pulleys 18 and 19 for each of the knees 14 are mounted on the frame member 15, being positioned respectively forwardly and rearwardly of the arcuate path traveled by the pulley 17 as the free end of the knee is permitted to move up and down, and thus located in the relative positions shown in FIGS. 2, 3, 4, and 5, the pulleys 18 and 19 being positioned in the same plane as the pulley 17. All three pulleys 17, 18 and 19, associated with each knee assembly, consequently have adequate clearance with respect to the adjacent face of the frame member 15 and with respect to the inside face of the knee 14, enabling all the pulleys to have freedom of rotation. A cable 20, having one end secured by any suitable means 21, to the side frame member 15 rearwardly of the rearmost wheel W3, passes forwardly over each of the three pulleys 19, 17 and 18 respectively, associated with each of the successive knees 14, thus passing under pulley 19, over pulley 17, and under pulley 18 in succession, as shown in FIGS. 2 and 4. After passing beneath the last or foremost pulley 18 the cable 20 passes beneath a front pulley 22 (FIG. 1) and then up to a drum or winch 23. The forward end of the cable 20 is secured to the drum 23.

In the carrying out of the invention in the manner illustrated in FIG. 3 the drums 23 for the forward ends of the cables on both sides of the trailer vehicle are secured to a common cross shaft 24. One end of this common cross shaft 24, carries a hand crank 25 by means of which the cables on the two sides of the trailer vehicle are shortened or lengthened in unison. A ratchet wheel 26 is secured to the shaft 24 and drum adjacent the crank 25 and a suitable pivotally mounted pawl 27 is provided for the ratchet wheel. However, if preferred, the two drums 23 for the cables on opposite sides of the trailer vehicle can be secured to separate shafts instead of to a common cross shaft and a crank, a ratchet wheel and pawl being then provided for each of the two drums and cables, thus enabling the cable on each side to be adjusted separately and independently.

As will be obvious from FIG. 4, when the length of the cable is fixed and the trailer vehicle is in normal operating position, the load on the three wheels transmitted through the respective knees and cable on each side will be equalized and each wheel will be in constant engagement with the ground. Consequently the individual knees will be raised or lowered with respect to the side frame member 15 as the individual wheels are raised or lowered by encountering irregularities in the terrain, and the raising or lowering of each knee, by reducing or increasing the proportionate length of cable for the other knees, will result in automatic adjustment or compensation by the other knees and wheels. Obviously this is of considerable advantage when heavy loads are being transported over rough terrain.

It will be obvious also that the bed of the trailer vehicle can be lowered or made to ride closer to the ground, or raised higher from the ground, by increasing or decreasing the effective length of the cable on each side, and further, if a separate drum and crank assembly are used for each of the two cables, it would be possible to have the bed of the trailer vehicle higher or lower on one side than on the other, an unusual condition which nevertheless could be very advantageous if the loaded trailer vehicle were being towed over ground which had a decided slope transversely of the direction of travel.

In the loading or unloading of such a trailer vehicle, as for example when heavy mobile equipment is to be transported by the trailer, it is highly desirable to have the rear end of the trailer lowered to the ground. With the forward end of the trailer attached to the towing vehicle, and thus with the forward end of the trailer held at a fixed distance above the ground, the increasing of the length of both cables will result in the tilting of the bed of the trailer rearwardly and downwardly, as illustrated in FIG. 2 and by the broken lines in FIG. 1, until the rear end of the trailer contacts the ground, this forming the bed of the trailer into ramp position. Then, when the loading is completed, the shortening of the two cables will result in raising the rear end of the trailer bed until the bed is restored to the normal substantially horizontal position. The same procedure would be followed in unloading the trailer, the front end of the trailer remaining hitched to the towing vehicle and thus held at a fixed height above the ground while the rear end is lowered to the ground permitting the load to be rolled off or to be slid off from the trailer.

Figure 7:
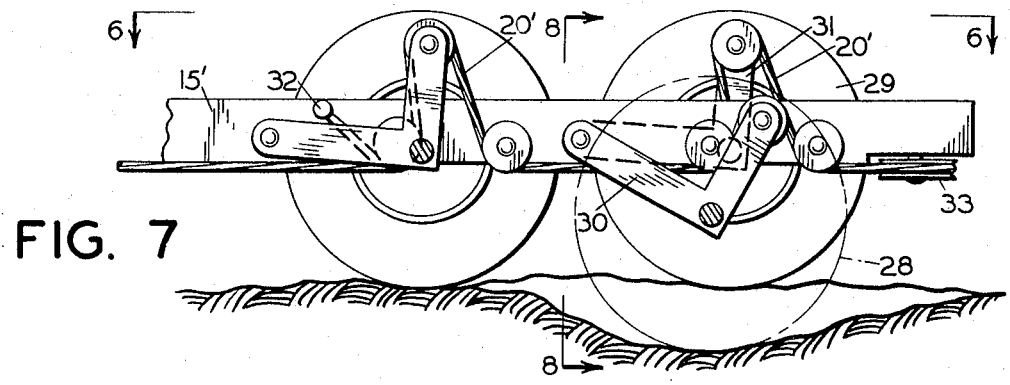
FIG. 7 is a fragmentary and more or less diagrammatic side elevation of the modified construction of FIG. 6, with the positions of the wheels on one side when the wheel is passing over rough terrain shown in broken lines.
Figure 6:
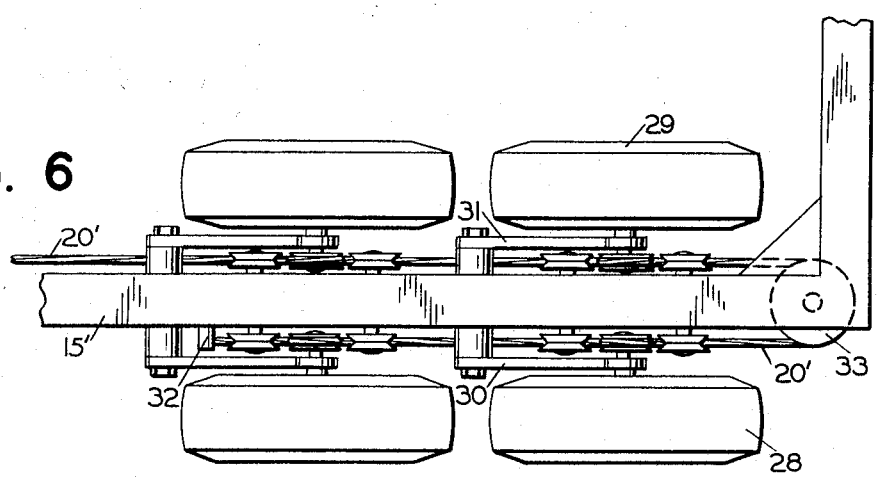
FIG. 6 is a fragmentary plan view of a modification of the invention in which pairs of wheels are mounted in tandem respectively on each side of the vehicle instead of the single wheels, this view being taken on line 6—6 of FIG. 7.
Figure 8:
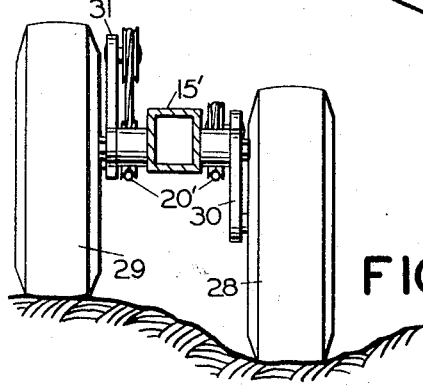
FIG. 8 is a fragmentary section on line 8—8 of FIG. 7.

In the modified construction shown in FIGS. 6, 7 and 8, pairs of wheels are used in place of single wheels, the wheels of each pair being mounted on opposite sides of a side frame member. Thus a pair of wheels 28 and 29 are mounted on the knees 30 and 31, respectively on opposite sides of the side frame member 15' respectively. The knees 30 and 31 are the same as those previously described and the relative arrangement of the three pulleys for each wheel and knee assembly is the same as in the case of the single tandem wheels. However, the cable 20' in this case has one end secured to the side frame member 15' ahead of one of the front wheels, instead of being secured rearwardly of the rear wheel, the cable being secured to the side frame member by any suitable means as indicated at 32 in FIGS. 6 and 7. The cable 20' after passing rearwardly over the three pulleys for each of the wheel and knee assemblies on that side of the side frame member 15' passes around a rear pulley 33, mounted on the vertical axis on the side frame member, and then passes forwardly over the pulleys of the successive wheel and knee assemblies on the other side of the same side frame member and finally passes to the drum or winch at the front of that side of the trailer.

With this modified wheel suspension it is obvious that there can be some additional compensation between the wheels of each pair on rough ground, as illustrated by the wheels 28 and 29 in FIG. 7, as well as between the various pairs of wheels. The raising or lowering of the bed of a trailer, or the lowering and subsequent raising of the rear end of the trailer while the front end is attached to the towing vehicle, is accomplished in the same manner as previously described in the case of the single tandem wheels on each side of the trailer.

Various minor modifications would be possible in the construction here described without departing from the principle of the invention, for example, a more elaborate winch or drum assembly than that shown in FIGS. 1 and 3 might be employed on large trailer vehicles, and the winch or drum probably motor operated. Possible other modifications will suggest themselves and it is not intended to limit the invention otherwise and as set forth in the claims.

I claim:

1. In a vehicle having a pair of longitudinal-extending side frame members, a pair of adjustable compensating wheel suspension assemblies located on opposite sides of the vehicle respectively, each assembly comprising a plurality of identical wheel-carrying knees spaced longitudinally along the side frame member, the forward end of each knee in the direction of normal travel of the vehicle pivotally mounted on said side frame member for up and down movement, the pivotal mounting for each knee so arranged as to provide a spacing of a few inches between the knee and said side frame member, a pulley on the rear end of each knee mounted on the face of the knee opposite said side frame member, a pair of cooperating pulleys for each knee mounted on said side frame member in the same plane with said first mentioned knee pulley, said cooperating pulleys located below said end pulley and positioned respectively on opposite sides of the arcuate path determined by said pulley with the pivotal movement of the knee, a ground wheel mounted on the knee between the forward and rear ends of the knee, a non-elastic flexible element engaging said end pulley and said pair of cooperating pulleys for each successive knee, one end of said flexible element secured to the vehicle frame, and length adjusting means for said flexible element mounted at the front of said vehicle, the forward end of said flexible element secured to the said length adjusting means.

2. In a trailer vehicle of the character described, a deck, a pair of longitudinally-extending side frame members supporting said deck, an adjustable compensating wheel assembly on each side of the trailer vehicle, each assembly comprising a plurality of identical wheel-carrying knees spaced longitudinally along the side frame member, the forward end of each knee in the direction of normal travel of the trailer vehicle pivotally mounted on said side frame member for up and down movement, the pivotal mounting for each knee so arranged as to provide a spacing of a few inches between the knee and the side frame member, a pulley on the rear end of each knee mounted on the face of the knee opposite said side frame member, a pair of cooperating pulleys for each knee mounted on said side frame member in the same plane with said first mentioned knee end pulley, said cooperating pulleys located below said end pulley and positioned respectively on opposite sides of the arcuate path determined by said end pulley with the pivotal movement of the knee, a ground wheel mounted on the knee between the forward and rear ends of the knee, a cable engaging the end pulley and said pair of cooperating pulleys for each successive knee, one end of said cable secured to said side frame member, a pair of drums mounted at the forward end of the trailer vehicle on opposite sides respectively, the front ends of the cables for the two compensating wheel suspension assemblies connected to said drums respectively, and means for operating said drums and thereby adjusting the effective length of said cables for said wheel suspension assemblies.

3. In a vehicle having a pair of longitudinally-extending side frame members, an adjustable compensating wheel suspension assembly on each side of the vehicle, each assembly comprising a plurality of pairs of identical wheel-carrying knees spaced longitudinally along the side frame member, the knees of each pair located on opposite sides of said side frame member respectively, the forward end of each knee in the direction of normal travel of the vehicle pivotally mounted on said side frame member for up and down movement, the pivotal mounting for each knee so arranged as to provide a spacing of a few inches between the knee and the side frame member, a pulley on the rear end of each knee mounted on the face of the knee opposite said side frame member, a pair of cooperating pulleys for each knee mounted on said side frame member in the same plane with said first mentioned knee end pulley, said pair of cooperating pulleys located below said knee end pulley and positioned respectively forwardly and rearwardly of the arcuate path determined by said knee end pulley with the pivotal movement of the knee, a ground wheel mounted on the knee between the forward and rear ends of the knee, a cable engaging the end pulley and the pair of cooperating pulleys for each knee in succession, one end of said cable secured to said side frame member ahead of the foremost cooperating pulley on one side of said side frame member, a return pulley mounted at the rear of said side frame member on a substantially vertical axis, said cable passing rearwardly and engaging the end pulley and cooperating pulleys for each successive knee on said one side of said side frame member and then passing around said return pulley and extending forwardly and engaging the end pulley and pair of cooperating pulleys for each successive knee on the opposite side of said side frame member, and length adjusting means for said cable mounted at the front of said vehicle, the forward end of said cable attached to said length adjusting means.

References Cited by the Examiner

UNITED STATES PATENTS 2,823,926 2/1958 Stover _____ 280—104
2,950,122 8/1960 Erickson _____ 280—104

FOREIGN PATENTS 675,400 11/1929 France.

BENJAMIN HERSH, *Primary Examiner.*

P. GOODMAN, *Assistant Examiner.*